United States Patent
Schrick et al.

(10) Patent No.: US 8,468,074 B2
(45) Date of Patent: Jun. 18, 2013

(54) REJECTED CHECKS ENVELOPE AND PROCESS

(75) Inventors: Christopher J. Schrick, Imperial, MO (US); Katherine Renee Fadden, Charlotte, NC (US); Craig Allan Hall, Albuquerque, NM (US)

(73) Assignee: Bank of America Corporation, Charlotte, NC (US)

( * ) Notice: Subject to any disclaimer, the term of this patent is extended or adjusted under 35 U.S.C. 154(b) by 334 days.

(21) Appl. No.: 12/414,142

(22) Filed: Mar. 30, 2009

(65) Prior Publication Data

US 2010/0250418 A1   Sep. 30, 2010

(51) Int. Cl.
*G06Q 40/00* (2012.01)

(52) U.S. Cl.
USPC .................. 705/35; 705/39; 705/45

(58) Field of Classification Search
USPC ............................................. 705/35
See application file for complete search history.

(56) References Cited

U.S. PATENT DOCUMENTS

| | | | | |
|---|---|---|---|---|
| 5,691,524 | A * | 11/1997 | Josephson | 705/40 |
| 6,003,677 | A * | 12/1999 | Foley | 209/2 |
| 6,130,613 | A * | 10/2000 | Eberhardt et al. | 340/572.7 |
| 6,654,487 | B1 | 11/2003 | Downs, Jr. | |
| 2001/0037297 | A1 * | 11/2001 | McNair | 705/40 |
| 2005/0015341 | A1 * | 1/2005 | Jackson | 705/45 |
| 2005/0108163 | A1 * | 5/2005 | Wells et al. | 705/42 |
| 2006/0182331 | A1 | 8/2006 | Gilson et al. | |
| 2007/0138255 | A1 * | 6/2007 | Carreon et al. | 235/379 |
| 2007/0244815 | A1 * | 10/2007 | Hawkins et al. | 705/45 |
| 2008/0010200 | A1 * | 1/2008 | Smith et al. | 705/41 |

OTHER PUBLICATIONS

International Search Report and the Written Opinion of the International Searching Authority mailed May 24, 2010 for International Application No. PCT/US 10/29259.

International Preliminary Report on Patentability for International Application No. PCT/US2010/029259 mailed Oct. 13, 2011.

* cited by examiner

*Primary Examiner* — Shahid Merchant
*Assistant Examiner* — Cho Kwong
(74) *Attorney, Agent, or Firm* — Michael A. Springs; Moore & Van Allen PLLC; Jeffrey R. Gray

(57) ABSTRACT

Embodiments of the invention provide apparatuses and methods for processing rejected checks. Checks that are rejected for deposit at deposit locations are captured on-site. A carrier picking up the rejected checks at the deposit location sorts the rejected checks into envelopes with data recognition markings. The recognition markings on the envelopes help with sorting and identifying the checks as rejected, as well as providing data to associate the rejected checks with a customer or an account. Image files are created for the rejected checks using an image capture system. Data files are created to match-up with the image files. The rejected checks are investigated to populate the data file, in order to determine how to process the rejected checks. The checks are submitted for posting and settlement often before any claims are made by customers for provisional funds for their rejected checks.

36 Claims, 8 Drawing Sheets

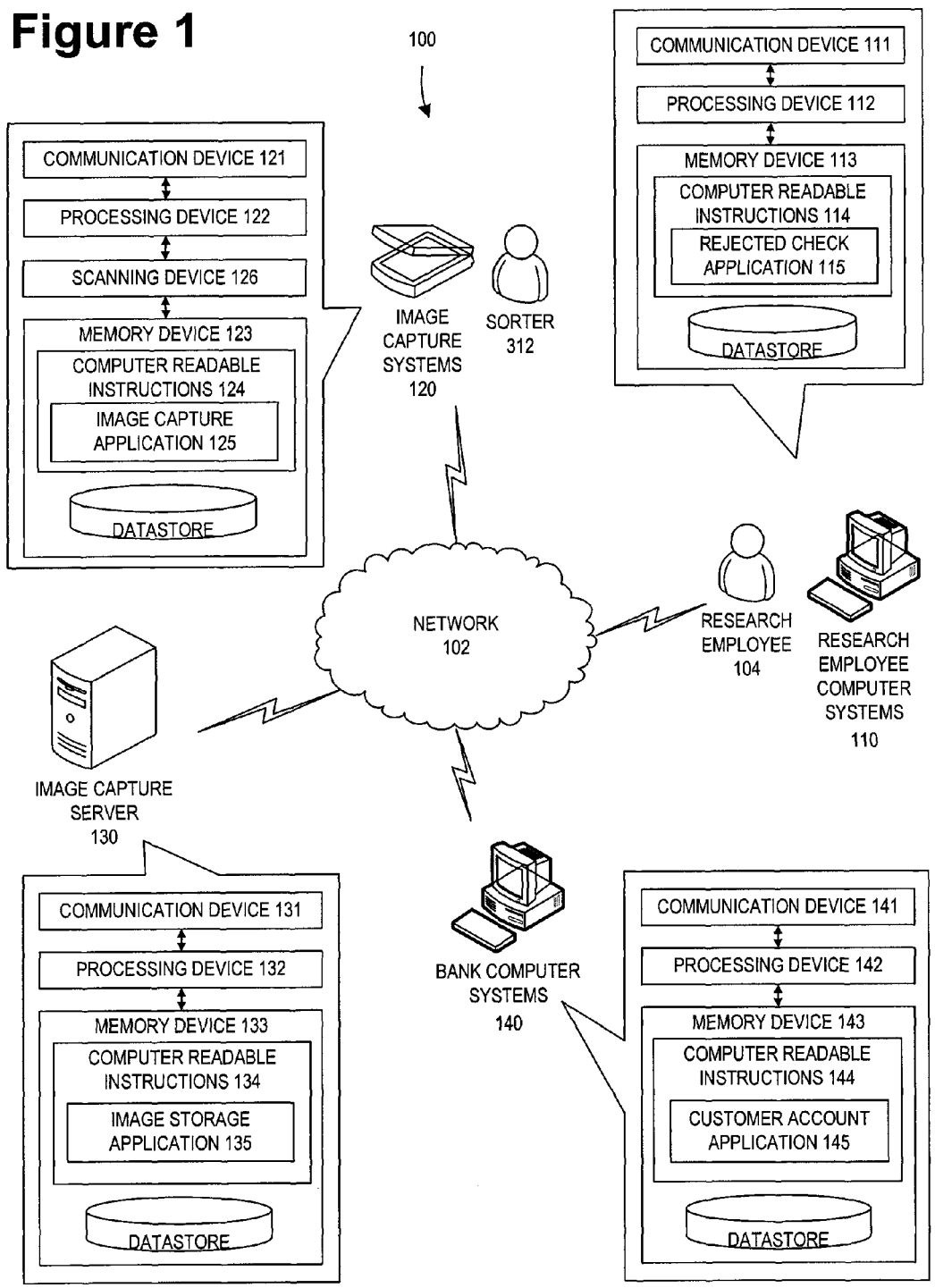

REJECTED CHECKS ENVELOPE AND PROCESS

FIELD

This invention relates generally to the field of check processing, and more particularly embodiments of the invention relate to apparatuses, systems, and methods, for the processing and settlement of rejected checks.

BACKGROUND

As known, checks are negotiable instruments drawn against deposited funds that order a bank to pay a specified amount of money to a specified person on demand. Check collection, or "check clearing," facilitates payment by moving checks from the banks where the checks are deposited ("receiving banks") to the banks on whose accounts the checks are drawn ("paying banks"), and then moving the payment in the opposite direction. This credits accounts at the receiving bank and debits accounts at the paying bank.

The passing of the Check Clearing for the 21$^{st}$ Century Act ("Check 21") by Congress allowed recipients of paper checks to create a digital version of the paper check called an Image Replacement Document ("IRD"). Under Check 21, IRDs, officially named "Substitute Checks," became a legal substitute for original paper checks. The IRDs include front and back images of the original checks, together with other data presented by a magnetic ink character recognition ("MICR") line along the bottom of the IRD, where such other data typically includes the routing and transit number, the check-writer's account number, and/or the dollar amount of the check.

Businesses and banks can work strictly with IRDs, transfer paper copies to IRDs, or in some cases use paper copies of the IRDs when exchanging the files between member banks, savings and loans, credit unions, services, clearinghouses, and the Federal Reserve Bank ("Fed"). Additionally, a process known as "remote deposit" allows customers to upload the digital images of checks to the depositing institution directly, in order to get their account credited. This is accomplished through electronic deposit of checks through an Automated Teller Machine ("ATM"), a process known as an electronic funds transfer ("EFT"). Some banks don't have the ability to create or process digital images. In such cases, third-party companies offer image processing services to these banks. The advent of Check 21 has greatly reduced check processing costs for banks, while speeding up fund transfers and reducing float time.

To oversee the EFT and establish consumer protections the United States Federal Reserve has established a number of regulations that sets rules, liabilities, and procedures for EFT systems. One such regulation is Regulation E. Generally, this regulation prescribes rules for solicitation and issuance of EFT debit cards, governs consumer liability for unauthorized transfers, and requires financial institutions to disclose annually the terms and conditions of EFT services. Specifically, it establishes the requirements for error resolution procedures for errors on EFT related accounts. Other countries likely have their own rules and regulations for EFT systems and the handling of errors arising therein.

An error in relation to an EFT, such as where funds were taken from an account by another's unauthorized transfer, or where a transfer was posted improperly due to a bank book-keeping error, (e.g., funds were not properly deposited in the account holder's account), fall under the error resolution provisions set forth in Regulation E. Under these provisions, an account holder can have the error associated with the EFT corrected by notifying the financial institution holding the account. Once notice is given, the account holder's bank has ten (10) business days from the time the complaint is logged to investigate, and if necessary correct the error. If the bank cannot fix the error, the bank must supply provisional credit to the account holder. Provisional credit is a temporary redeposit of funds in a disputed EFT while the transaction is being investigated. After the ten (10) day investigation period and the deposit of provisional credit, the financial institution has up to forty-five (45) days in most transactions to investigate the alleged error. The consumer's account liability is limited by regulation to $50 if the financial institution is notified of the error, but otherwise can be as high as $500, if the financial institution is not timely notified.

Unfortunately, there are sometimes gaps throughout the EFT processing and settlement process, such as accounting errors and lost images, whereby checks are not properly debited and credited in the appropriate accounts. Specifically, errors in processing may occur at ATMs or other remote deposit locations when a customer is trying to deposit a check. For example, if power is lost to an ATM when a check image is being processed the transaction is terminated and the check being deposited is not properly captured electronically. In other scenarios the image scanning device may not be able to read the MICR data, or properly capture the image of the check. In these or other situations, a check may not be returned to the customer, but instead may be dropped into a rejected checks bin inside the ATM. Depending on the specific procedures at relative banks these checks may, at some banks, go weeks or months before they are processed and in some cases they are never processed at all.

There is a need to develop apparatuses, systems, and methods to process rejected checks in an efficient manner, improving on speed and customer satisfaction, while reducing the cost associated with processing rejected checks.

BRIEF SUMMARY

Embodiments of the present invention address the above needs and/or achieve other advantages by providing apparatuses (e.g., a system, computer program product, and/or other device), methods, or a combination of the foregoing for processing and settlement of rejected checks.

One embodiment of the invention is a rejected check processing method. The method comprises collecting a plurality of rejected checks deposited in a remote capture system. The method further comprises acquiring the plurality of rejected checks and sorting the plurality of rejected checks into batches for processing. The method further comprises processing the plurality of rejected checks based on information related to the batches. Next the method comprises capturing an image of the plurality of rejected checks and creating a data file associated with the images of the plurality of rejected checks.

In further accord with an embodiment of the invention, the method of acquiring the plurality of rejected checks comprises picking up the plurality of rejected checks from the remote capture system.

In one embodiment of the invention, sorting the plurality of rejected checks into batches for processing comprises placing the rejected checks into an envelope. In another embodiment of the invention, the envelope has machine-readable code that identifies the remote capture system. In further accord with an embodiment of the invention, the envelope has machine-readable code that comprises a routing and tracking number for the rejected checks, or uniquely identifies the envelope.

In another embodiment of the invention, processing the plurality of rejected checks based on information related to the batches comprises identifying computer readable information related to the batches for associating the rejected checks with the remote capture system at which they were deposited.

In yet another embodiment of the invention, capturing an image of the plurality of rejected checks comprises scanning the plurality of rejected checks through an image capture system. In further accord with an embodiment of the invention, scanning the check through an image capture system comprises performing the scan at the location of the remote capture system and sending the images of the plurality of rejected checks electronically to a representative for processing.

In another embodiment of the invention, creating a data file associated with the images of the plurality of rejected checks comprises investigating the status of the plurality of rejected checks and populating the data file either manually or systematically with data processing information from at least one of the batches, the plurality of rejected checks, or customer accounts.

In another embodiment of the invention, the method further comprises researching the rejected checks using the image files and data files for processing. Researching the rejected checks comprises determining if claims have been made by customers for the plurality of rejected checks, determining if the claims are valid, and determining if the plurality of rejected checks are valid.

One embodiment of the invention is a method of processing rejected checks. The method comprises capturing a plurality of rejected checks at a deposit location. The method further comprises sorting the plurality of rejected checks into envelopes used for processing. Next, the method comprises, processing the plurality of rejected checks based on information located on the envelopes. The method further comprises capturing images of the plurality of rejected checks, and creating a data file associated with the images of the plurality of rejected checks.

In further accord with an embodiment of the invention, sorting the plurality of rejected checks into the envelopes for processing comprises placing the plurality of rejected checks into envelopes that contain identification information identifying the deposit location. In another embodiment of the invention, processing the plurality of rejected checks based on information located on the envelopes comprises entering manually or systematically the identification information for deposit locations from the envelopes into an application.

In yet another embodiment of the invention, capturing an image of the plurality of rejected check comprises scanning the plurality of checks through an image capture system into an application. In further accord with an embodiment of the invention, scanning the plurality of checks through an image capture system comprises performing the scan at the location of the remote capture system and sending the images of the plurality of rejected checks electronically to a representative for processing.

In another embodiment of the invention, creating a data file associated with the image of the plurality of rejected checks comprises investigating the status of the plurality of rejected checks, and populating the data file either manually or systematically with data processing information from at least one of the envelopes, the plurality of rejected checks, or customer accounts.

In accord with an embodiment of the invention, the method further comprises researching the rejected checks for processing using the image files and data files. Researching the rejected checks comprises determining if claims have been made by customers for the plurality of rejected checks, determining if the claims are valid, and determining if the plurality of rejected checks are valid.

One embodiment of the present invention is a method for processing rejected checks. The method comprises securing paper copies of a plurality of rejected checks in a remote capture system. The method further comprises sorting the plurality of the rejected checks into batches. Next the method comprises placing the paper copies of the plurality of rejected checks into an envelope with machine-readable code attached to the envelope. Then the method comprises processing the envelopes by capturing image files of the plurality of rejected checks in the envelope, using a machine to read the machine-readable code, and associating the image files of the plurality of rejected checks with data obtained by the machine from the machine-readable code.

In further accord with an embodiment of the invention, the data obtained by the machine from the machine-readable code comprises information identifying the remote capture system.

In yet another embodiment of the invention, the data obtained by the machine from the machine-readable code comprises information uniquely identifying the envelope.

In accord with an embodiment of the invention, the data obtained by the machine from the machine-readable code comprises routing and transmitting information identifying where the rejected checks should be routed and transmitted.

In another embodiment of the invention, associating the image files of the plurality of rejected checks with data obtained by the machine from the machine-readable code comprises creating data files associated with the image files of the plurality of rejected checks, wherein the data files include data obtained from the machine-readable code.

One embodiment of the invention is a rejected check processing system, comprising an envelope configured to hold one or more checks rejected at a remote image capture device and a first machine-readable code attached to or configured to be attached to the envelope and configured to identify the remote capture device.

In another embodiment of the invention, the rejected check processing system further comprises a second machine-readable code attached to or configured to be attached to the envelope and configured to uniquely identify the envelope.

In further accord with an embodiment of the invention, the envelope is configured to hold a plurality of checks rejected at a single remote image capture device.

In another embodiment of the invention, the remote capture device comprises an automated teller machine (ATM).

In yet another embodiment of the invention, the first machine-readable code comprises a barcode that uniquely identifies the remote capture device.

In another embodiment of the invention, the first machine-readable code comprises a radio frequency identification tag that uniquely identifies the remote capture device.

In accord with another embodiment of the invention, the first machine-readable code is attached to a label configured to be attached to the envelope.

In another embodiment of the invention the rejected check processing system, further comprises a second machine-readable code attached to or configured to be attached to the envelope, and configured to uniquely identify the envelope, or provide a routing and transit number.

In further accord with an embodiment of the invention, the second machine-readable code comprises a magnetic ink character recognition identification marking that can be used to uniquely identify the envelope.

In another embodiment of the invention, the envelope, having the first and second machine-readable codes attached thereto, is configured to be used as a batch header on a bulk capture device.

In yet another embodiment of the rejected check processing system, the system further comprises a machine configured to read the first machine-readable code and associate all of the checks contained within the envelope with data obtained from the machine-readable code.

In accord with another embodiment of the invention, the rejected check processing system comprises a window in the envelope.

In another embodiment of the invention, the rejected check processing system, further comprises a memory device, a machine-readable code reader, an imaging device, and a processing device. The machine-readable code reader is configured to read the first machine-readable code associated with the envelope and obtain information therefrom. The imaging device is configured to capture an image of one or more checks contained in the envelope. The processing device is configured to store, in the memory, the captured images of the one or more checks contained in the envelope and associate the captured images in the memory device with the information obtained from the first machine-readable code.

One embodiment of the invention is an apparatus for processing rejected checks. The apparatus comprises a memory device, a machine-readable coder reader, an imaging device, and a processing device. The machine-readable code reader is configured to receive a plurality of envelopes, each envelope containing one or more rejected checks and having a first machine-readable code thereon, wherein the machine-readable code reader is configured to read the first machine-readable code on each envelope and obtain information therefrom. The imaging device is configured to capture an image of one or more rejected checks contained in each envelope. The processing device is configured to store, in the memory device, the captured images of the one or more rejected checks and associate each captured image in the memory device with the information obtained from the first machine-readable code on the envelope in which the captured check associated with the captured image arrived.

In further accord with an embodiment of the invention, the information obtained from the machine-readable code comprises information identifying a remote capture system that captured the rejected check.

In another embodiment of the invention, the remote capture system comprises an automated teller machine (ATM).

In yet another embodiment of the invention, the information obtained from the machine-readable code comprises a routing and transit number or a unique envelope number.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 2A:
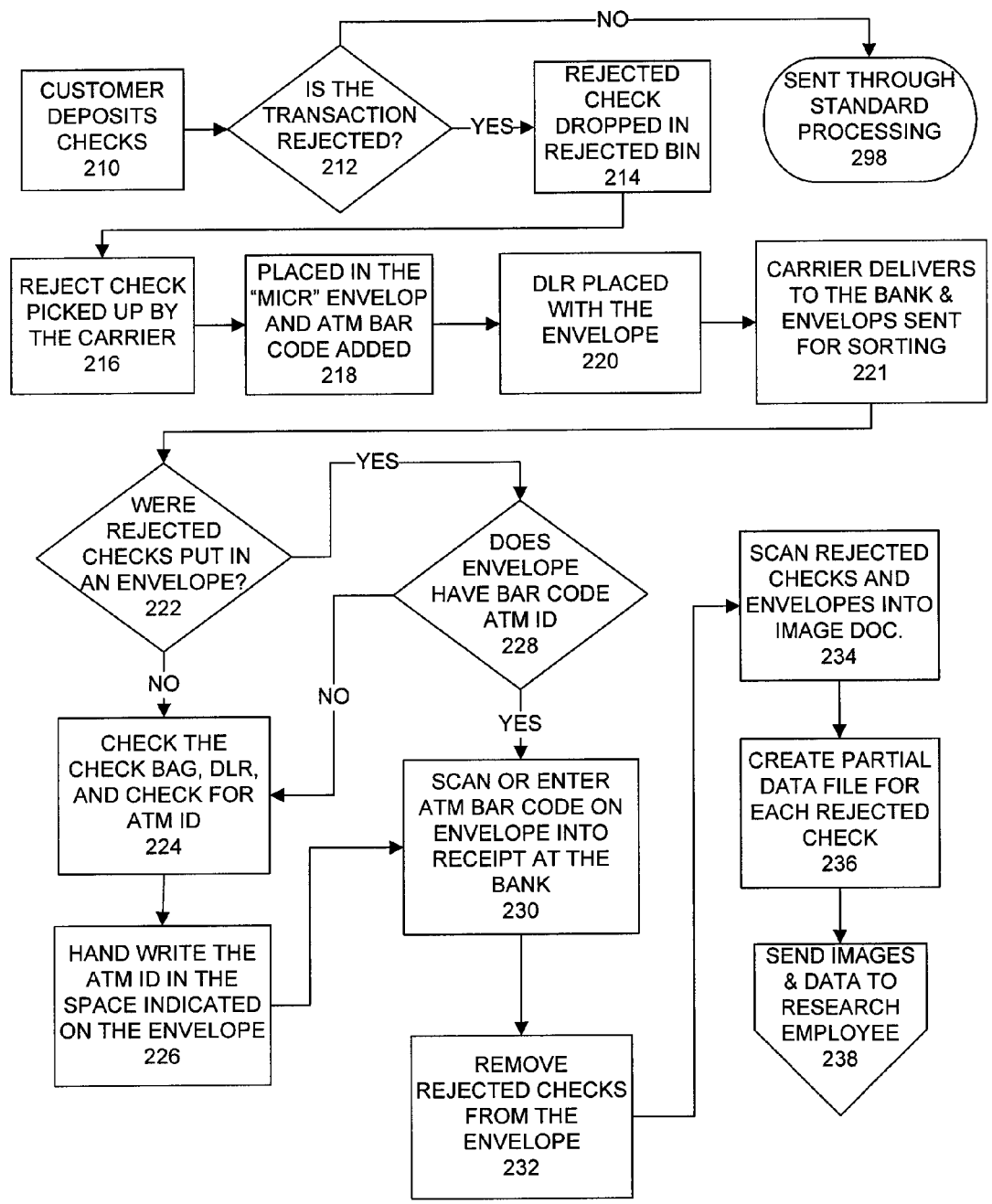
Figure 2B:
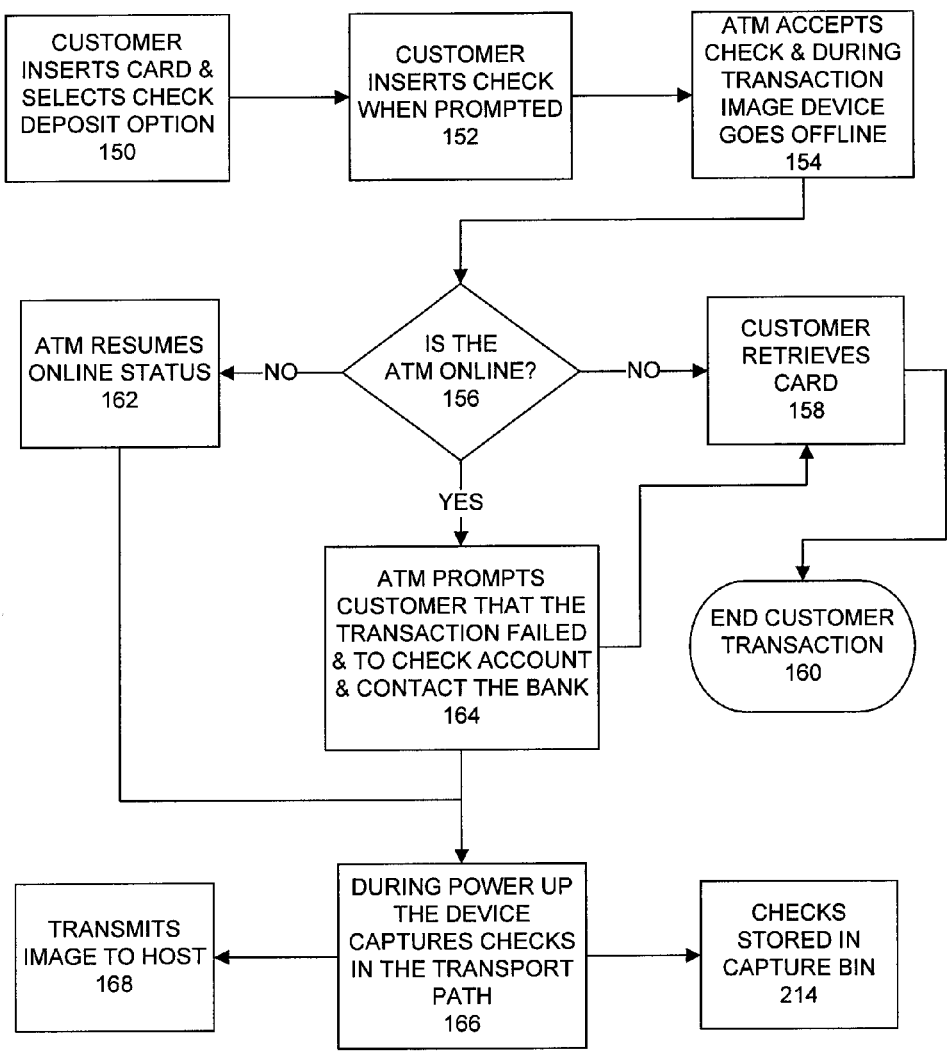
Figure 3:
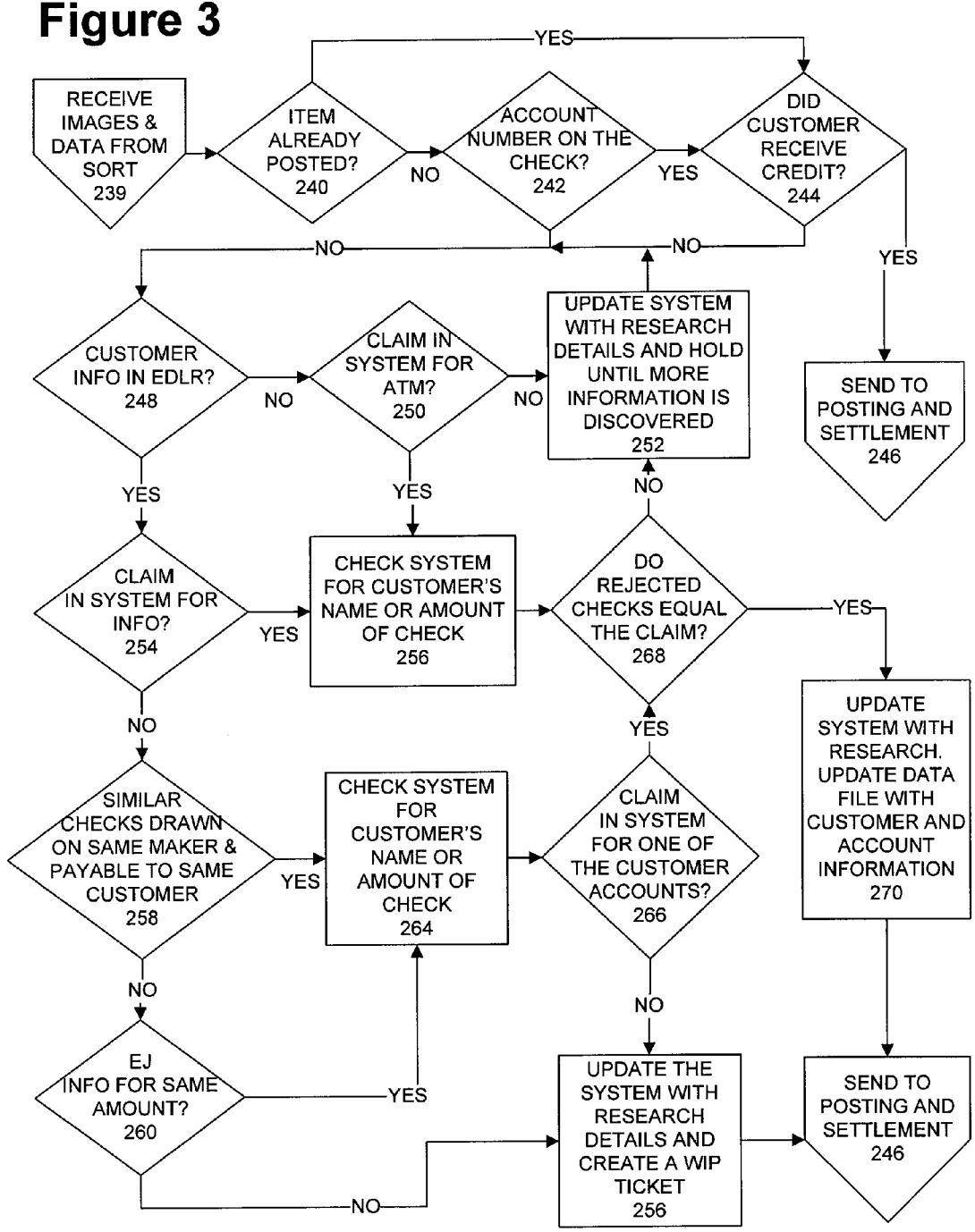
Figure 4:
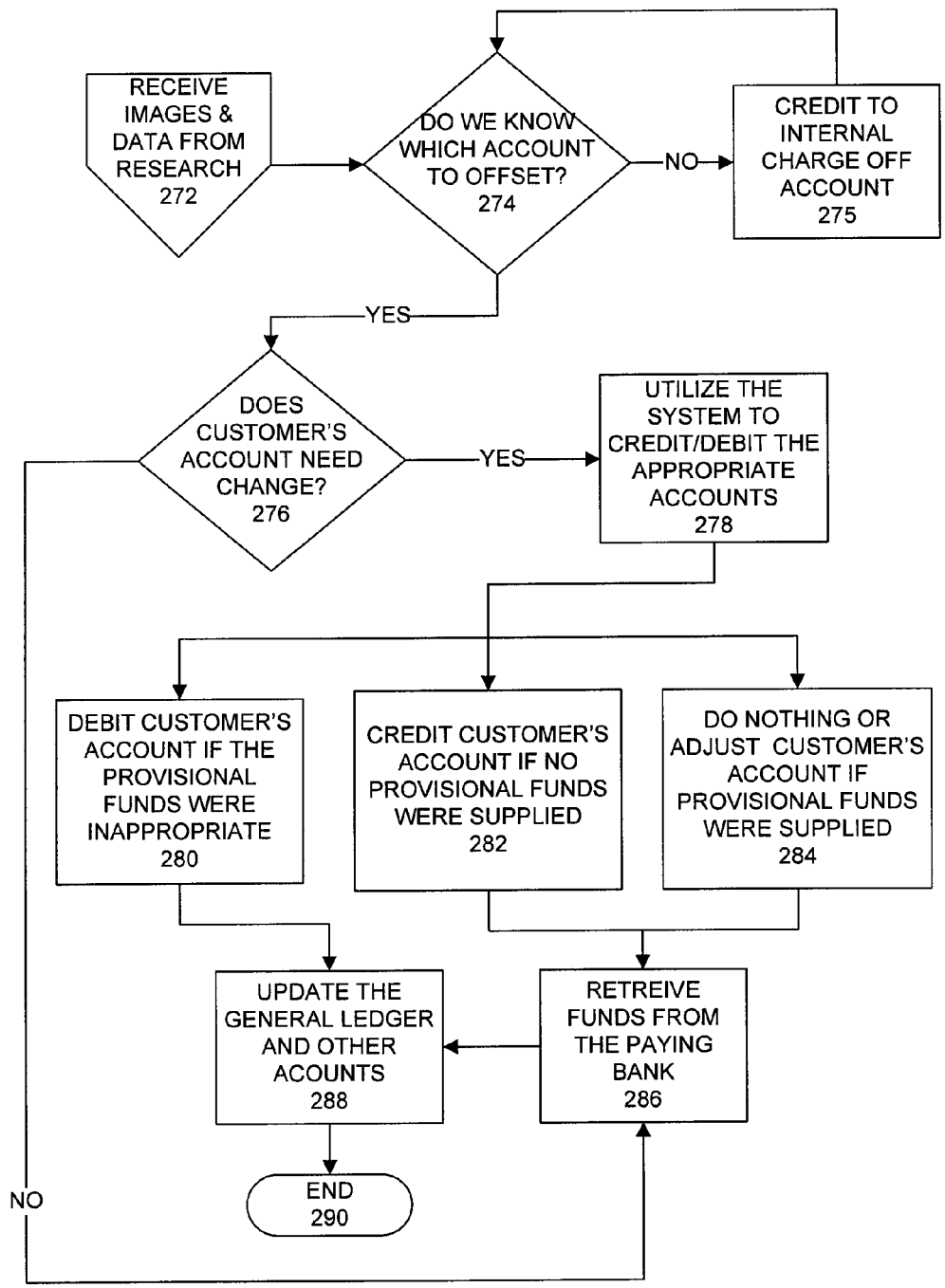
Figure 5:
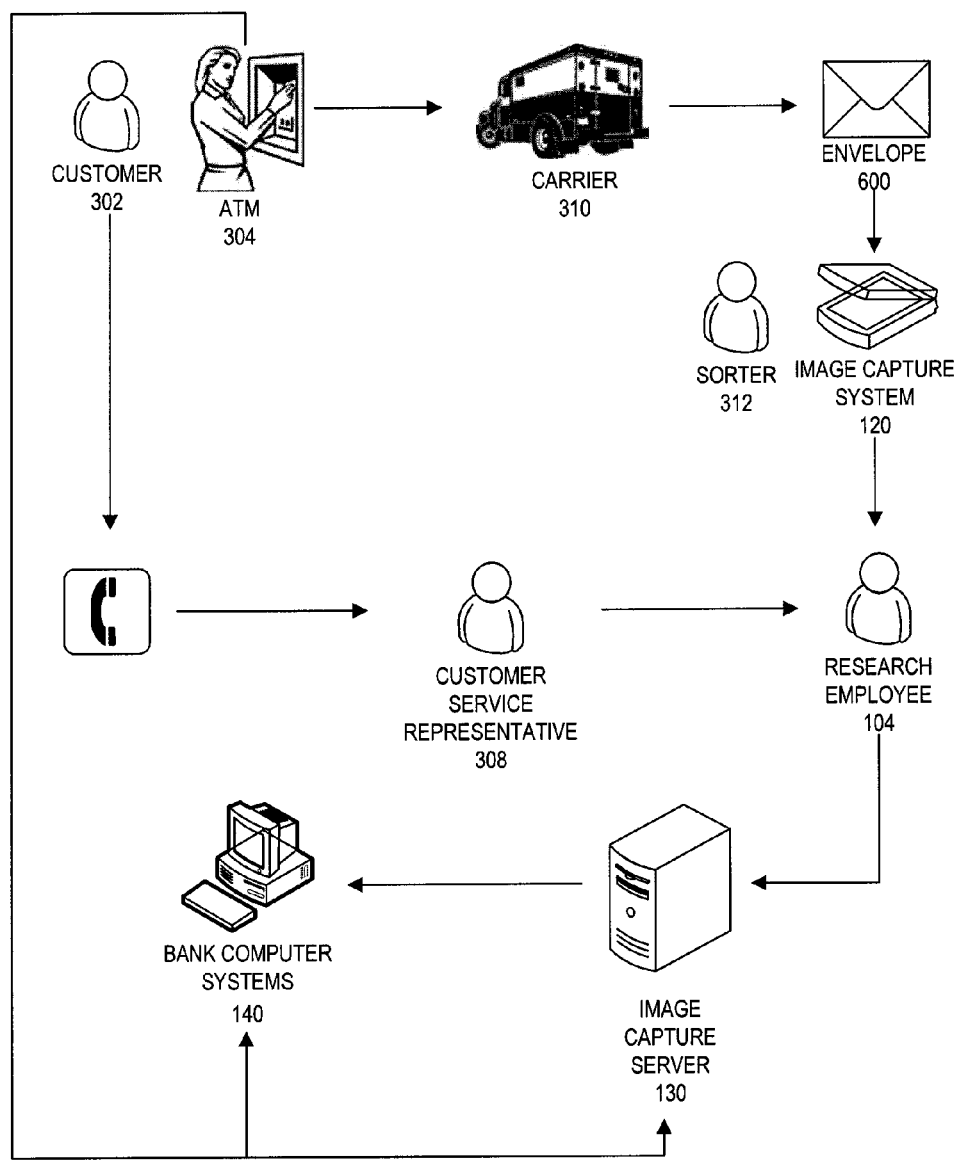
Figure 6:
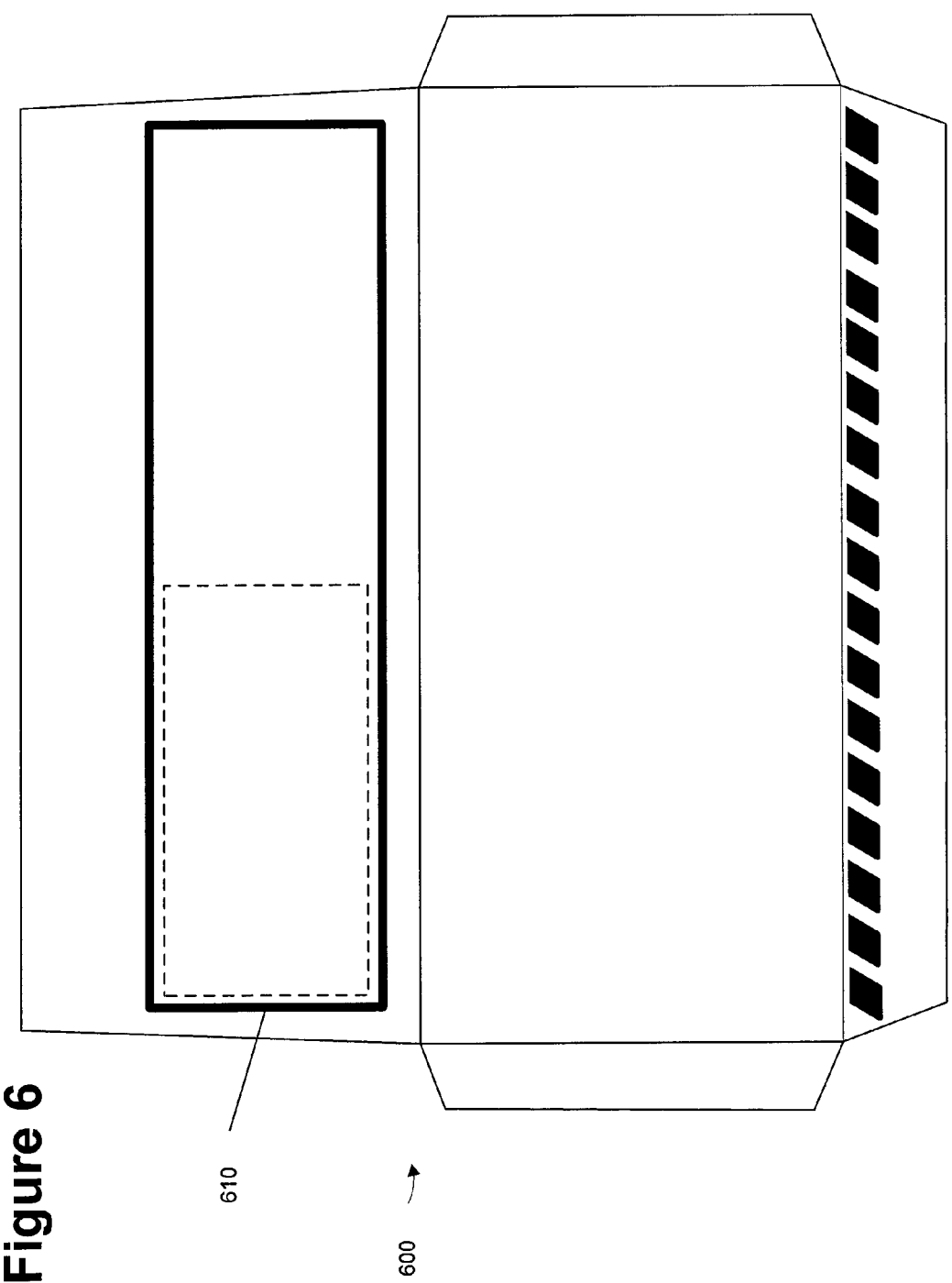
Figure 7:
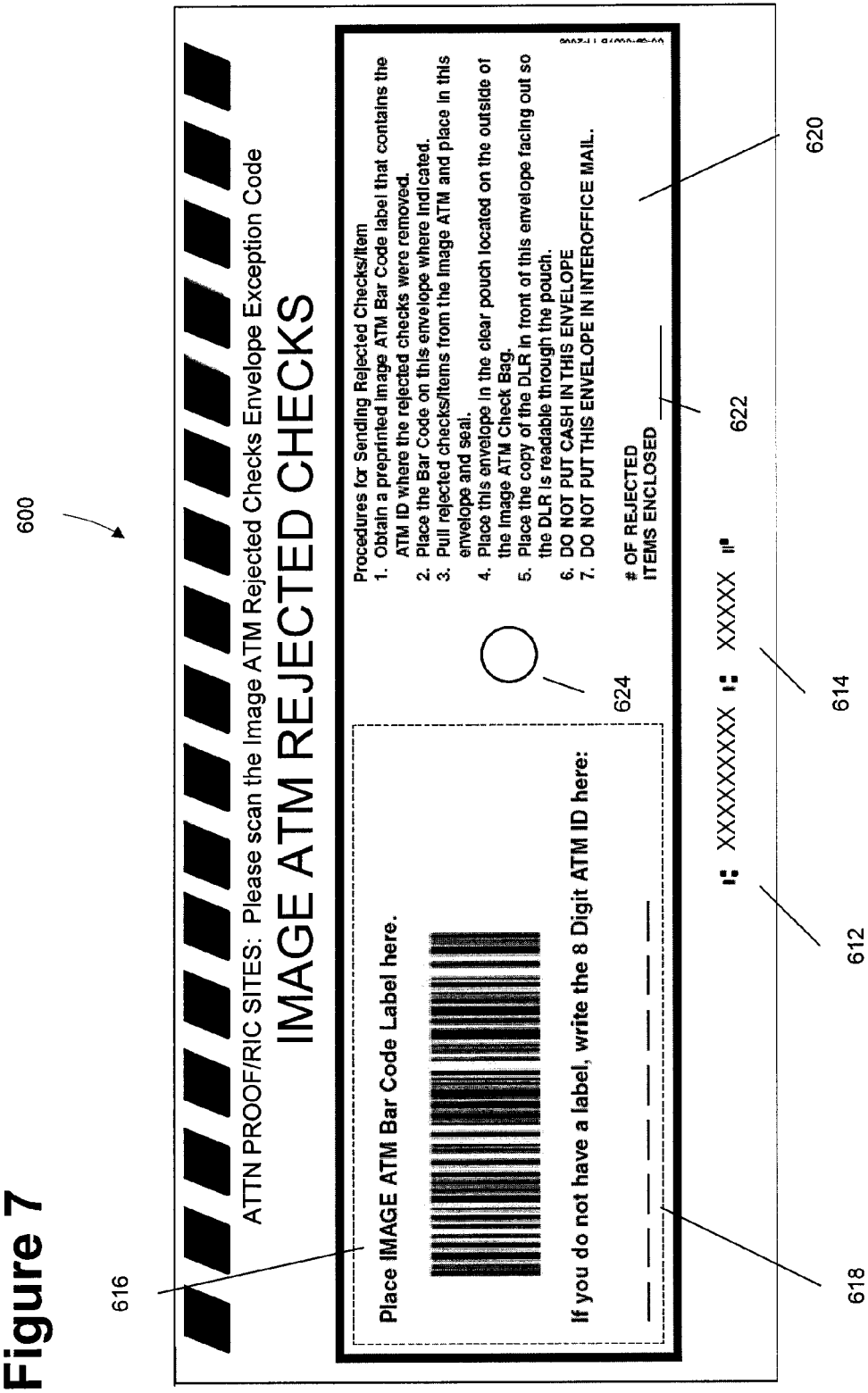

Having thus described embodiments of the invention in general terms, reference will now be made to the accompanying drawings, which are not necessarily drawn to scale, and wherein:

FIG. 1 provides a block diagram illustrating a rejected check system, in accordance with an embodiment of the present invention;

FIG. 2A provides a process flow illustrating how a rejected check is moved through the rejected check system from the customer depositing the rejected check to the check being sorted and processed for further research, in accordance with one embodiment of the present invention;

FIG. 2B provides a process flow illustrating how a check may become rejected at an ATM, in accordance with one embodiment of the present invention;

FIG. 3 provides a process flow illustrating how a rejected check is moved through the rejected check system from researching the rejected check to posting and settlement, in accordance with one embodiment of the present invention;

FIG. 4 provides a process flow illustrating how the rejected check is moved through posting and settlement, in accordance with one embodiment of the invention;

FIG. 5 provides a process map illustrating how the people and systems involved in the rejected check system interact while moving a rejected check through the system, in accordance with an embodiment of the present invention;

FIG. 6 illustrates a rejected check envelope for processing rejected checks, in accordance with an embodiment of the present invention; and FIG. 7 illustrates a label of the rejected check envelope for processing rejected checks, in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although the embodiments of the invention described herein are generally described as involving a "bank," one of ordinary skill in the art will appreciate that other embodiments of the invention may involve other businesses or financial institutions that take the place of or work in conjunction with the bank to perform one or more of the processes or steps described herein as being performed by a bank.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

FIG. 1 illustrates a rejected check system 100 in accordance with an embodiment of the present invention. As illustrated in FIG. 1, the research employee computer systems 110 are operatively coupled, via a network 102, to image capture systems 120, image capture servers 130, and the bank computer systems 140. In this way, the bank research employee 104 can receive and send electronic check images and other related data to and from these systems. The network 102 may be a global area network (GAN), such as the Internet, a wide area network (WAN), a local area network (LAN), or any other type of network or combination of networks. The network 102 may provide for wireline, wireless, or a combination of wireline and wireless communication between devices in the network.

As illustrated in FIG. 1, the research employee computer systems 110 generally include a communication device 111, a processing device 112, and a memory device 113. The processing device 112 is operatively coupled to the communication device 111 and the memory device 113. The processing device 112 uses the communication device 111 to communicate with the network 102, and other devices on the network 102, including but not limited to the image capture systems 120, the image capture servers 130, and the bank computer systems 140. As such, the communication device 111 generally comprises a modem, server, or other device for communicating with other devices on the network 102, and a display, mouse, keyboard, microphone, and/or speakers for communicating with one or more users, including a research employee 104. As further illustrated in FIG. 1, the research employee computer systems 110 include computer-readable instructions 114 stored in the memory device 113, which include the computer-readable instructions 114 of a rejected check application 115. As discussed later the rejected check application 115 allows the research employee 104 to take the images of the rejected checks from the image capture system 120 and populate a data file with the required information for posting and settlement.

The image capture systems 120 generally include a communication device 121, a processing device 122, a memory device 123, and a scanning device 126. The processing device 122 is operatively coupled to the communication device 121, the memory device 123, and the scanning device 126. The processing device 122 uses the communication device 121 to communicate with the network 102, and other devices on the network 102, including but not limited to the research employee computer systems 110, the image capture servers 130, and the bank computer systems 140. As such, the communication device 121 generally comprises a modem, server, or other device(s) for communicating with other devices on the network 102, and a display, mouse, keyboard, microphone, and/or speakers for communicating with one or more users. As further illustrated in FIG. 1, the image capture systems 120 contain computer-readable program instructions 124 stored in the memory device 123, which includes the computer-readable instructions 124 of an image capture application 125. The image capture application 125 is used to scan the rejected paper checks into electronic image form, retrieve data from the scanned images, and send the images to the research employee computer system 110, as discussed later. In one embodiment of the invention, the bank has multiple image capture systems 120 for remotely processing rejected checks at ATM or back office locations, as discussed later. Although FIG. 1 illustrates the image capture system 120 as one system, it is important to note that there can be one or multiple systems, each with similar components that handle imaging or depositing checks.

The image capture server 130 generally includes a communication device 131, a processing device 132, and a memory device 133. The processing device 132 is operatively coupled to the communication device 131, and the memory device 133. The processing device 132 uses the communication device 131 to communicate with the network 102, and other devices on the network 102, including but not limited to the research employee computer systems 110, image capture systems 120, and the bank computer systems 140. As such, the communication device 131 generally comprises a modem, server, or other device(s) for communicating with other devices on the network 102. As further illustrated in FIG. 1, the image capture systems 130 contain computer-readable program instructions 134 stored in the memory device 133, which includes the computer-readable instructions 134 of an image storage application 135. The image storage application 135 is used to store the image and associated files in a secure location for access by the various bank employees and systems.

As illustrated in FIG. 1, the bank computer systems 140 generally include a communication device 141, a processing device 142, and a memory device 143. The processing device 142 is operatively coupled to the communication device 141 and the memory device 143. The processing device 142 uses the communication device 141 to communicate with the network 102, and other devices on the network 102, including but not limited to the research employee computer systems 110, the image capture systems 120, and the image capture servers 130. As such, the communication device 141 generally comprises a modem, server, or other device for communicating with other devices on the network 102, and a display, mouse, keyboard, microphone, and/or speakers for communicating with one or more users. As further illustrated in FIG. 1, the bank computer systems 140 include computer-readable instructions 144 stored in the memory device 143, which include the computer-readable instructions 144 for, but not limited to, customer account applications 145. The customer account applications 145 allow the research employee 104 to make the necessary inquires into, and changes to the accounts of customers based on the rejected checks and data files, as discussed later. Although FIG. 1 illustrates the bank computer system 140 as one system, it is important to note that there can be one or multiple systems with one or multiple applications, each with similar components that handle a number of functions related to customer accounts or other systems at the bank.

FIGS. 2 through 4, illustrate the rejected check process flow and FIG. 5 illustrates some of the interactions between the people and systems in the process, in accordance with one embodiment of the invention. The process is being described through the use of an ATM 304, but it is understood that the process works equally well where checks are being deposited though a remotely located image capture device. As illustrated in block 210 of FIG. 2A, the customer 302 deposits a check into an ATM 304. As illustrated by block 212 and 298, if the deposited check transaction is accepted the processing of the check follows the standard image check process and the rejected check process described herein ends. However, as illustrated by block 212, if the transaction is rejected for whatever reason, such as the ATM 304 loses power, there is a paper jam, the image reader cannot read the check and the user does not retrieve the returned check, or any other technical problems or human mistakes, the transaction will be stopped. Thereafter, the "rejected" check is dropped in the rejected check bin within the ATM 304, as illustrated by block 214.

FIG. 2B illustrates the steps in blocks 210, 212, and 214 in more detail as they would relate to how a rejected check may occur at an ATM 304 location. As illustrated by block 150, the customer 302 inserts his/her card into the ATM 304 and selects the check deposit option. The customer 302 then inserts his/her check when prompted by the ATM 304, as illustrated in block 154. As illustrated in block 156, the ATM 304 will accept the check and during the transaction the image device goes offline, which can be caused by a number of factors such as a hardware failure, software error, power outage, etc. As illustrated by diamond 156, a number of steps could occur in the process depending on if the ATM is still online. As is the case with the image device, the ATM could become offline through a hardware failure, software error, power outage, etc. If the ATM is not online the customer 302 will retrieve his/her card, as illustrated by block 158 and the customer 302 transaction ends, as illustrated by termination block 160. Additionally, when the ATM 302 comes back online and the image device is in the power up cycle, which may only occur after hardware, firmware, and/or software changes are made to the image device, it will capture any checks remaining in the transport path, as illustrated by blocks 162 and 166. Thereafter, the image of the checks will be transmitted to the image host for processing, as illustrated by block 168. If the image is still not captured the checks will be stored in the rejected bin, as illustrated by block 214.

Alternatively, if the ATM 304 is still online when the image device goes offline, the ATM 304 will prompt the customer how to proceed. As illustrated by block 164, the ATM 304 will indicate to the customer 302 that the transaction has failed and that the customer 302 should check the customer's 302 account and contact the financial institution with any inconsistencies or problems. As is the case where the ATM 304 is offline the customer 302 will retrieve his/her card and the customer transaction ends as illustrated by blocks 158 and 160. Furthermore, as illustrated in block 166 during the power up cycle of the image device it will capture any checks remaining in the transport path. Thereafter, the image of the checks will be transmitted to the image host for processing, as illustrated by block 168. If the image is still not captured the checks will be stored in the rejected bin, as illustrated by block 214.

As illustrated by block 216, when the carrier 310 is sent to the ATM 304 to pick-up the deposits or deposit cash, the carrier 310 removes the rejected checks from the ATM 304 bin. Under a conventional process, at this point, the carrier 310 would bundle all of the rejected checks and deliver the checks to the bulk file storage department. The rejected checks would only be examined on a demand basis. A customer 302 would have to call the bank and speak to a customer service representative 308 in order to make a claim that they did not receive credit for an item that they deposited. Under regulation E the bank would deposit provisional funds into the account of the customer 302 while the bank investigated the legitimacy of the customer's 302 claim. The claim would continue up through the appropriate channels for investigation. A research team would be assigned the claim and would request the original check from the bulk file storage. The bulk file storage team would locate the check in the bundle of rejected checks and send it to the research team. The research team would then manually process the original check, in paper form. If the research team found that the customer's 302 claim 1s valid, the bank would process the check through posting and settlement. Thereafter, the bank would receive, from the paying bank, the amount on the check and if the amount was different than the provisional funds the differences would be corrected in the appropriate accounts. In the alternative, if the research team found the customer 302 claim 1nvalid the bank would retrieve the provisional funds that they gave to the customer. This process in total took on average twenty-five (25) days to complete. During this time the bank would be without the provisional funds they provided the customer 302 for, on average, twenty-five (25) days. The time period of investigation prevented the bank from using the funds during that time for other purposes, such as investing or lending, and therefore the bank lost out on earning additional income from the funds.

In the new rejected check process described herein, as illustrated by block 218, the carrier 310 places the rejected checks into the proper rejected check envelopes 600, as illustrated by block 218. An example of the rejected check envelope 600 is illustrated in FIGS. 6 and 7. The envelopes 600 have a label 610, with information on it to help in processing the rejected checks, as illustrated in FIG. 7. In some embodiments the envelope 600 and/or the label 610 has magnetic ink character recognition ("MICR") data imprinted on the outside of the envelope 600 in different locations. In one embodiment, MICR data indicates the routing/transit number 612, as well as an envelope number 614. The MICR data is used to identify, sort, and track the envelope 600 using a sorting device that can read the MICR data and store the associated data for processing. In other embodiments, other types of machine-readable code and systems may be used instead of MICR data. Other types of machine-readable codes include barcodes, two-dimensional barcodes, machine readable text, alphanumeric characters, radio-frequency identification tags, and/or the like.

Furthermore, in some embodiments, the label 610 has a location for affixing a bar code label 616. The bar code label 616 can be scanned by a laser, other optical reader, or other device. By scanning the bar code label 616 important data related to the envelope 600, such as but not limited to locational or processing information related to the ATM 304 or other device in which the customer 302 tried to deposit the check, can be obtained and stored for use in processing. In other embodiments of the invention, the bar code label 616 could be replaced by another type of identification marking or machine-readable code that can be read electronically. In some embodiments, the envelope 600 also has a location for the ATM identification number 618, which can be included in the bar code label 616, but in other embodiments is handwritten on the envelope by the carrier 310 or other employee sorting or investigating the rejected checks.

In some embodiments the envelope 600 will also contain process directions 620, instructing the carriers 310 how the rejected checks should be processed. The carrier 310 first obtains a preprinted image ATM bar code label 616 that contains the ATM identification number 618 of the ATM 304 from which the rejected checks were removed. In one embodiment, a plurality of these labels are stored at the ATM 304. In other embodiments, the carrier 310 possesses the labels or prints them from a portable printer. The carrier 310 places the bar code label 616 on the envelope 600 where indicated. The ATM bar code label 616 will help the bank identify where the rejected checks were originally deposited, to allow the bank to associate the rejected checks with data retrieved from the ATM 304 and better identify, sort, and track the rejected checks for that ATM 304. Thereafter, the carrier 310 places the rejected checks in the envelope 600 and seals the envelope 600. Alternatively, the carrier 310 could write the ATM identification number 618 in the proper location on the envelope label 610.

The carrier 310 then places the envelope 600 in an ATM check bag, used for transporting all of the checks deposited at the ATM locations. The carrier 310 also places the deposit listing receipt ("DLR") with the rejected checks envelope 600 so the DLR is visible from outside of the bag, as illustrated by block 220. For example, in one embodiment, the ATM check bag has an outside pouch and the rejected check envelope is placed in the pouch, the DLR is placed on top of the envelope in the pouch, and the pouch is then sealed. The DRL contains information stored in the ATM 304 related to deposits made from the time of the previous deposit pull activities through the current deposit pull activities (e.g. total dollar value of deposits, total number of items deposited, date rage of deposited items, date of deposit pull, etc.). The carrier 310 should also write on the envelope 600 the number of rejected checks enclosed within the envelope 600 in the tally section 622 of the label 610. In some embodiments of the invention the envelope 600 has at least one hole 624 or window, so a person handling the envelope 600 would know immediately whether or not there were checks inside.

The carrier 310 delivers the rejected checks in the envelopes 600 to the bank offices, for entry into the reject repair process, in order to identify the intended depositor, as illustrated by block 221. At these locations, unlike in the past where the rejected checks were stored until a customer 302 made a claim, the rejected checks are sent for sorting and processing through the image capture systems 120. First, a sorter 312 determines if the rejected checks were properly placed in an envelope, as illustrated by diamond 222. If not, the sorter 312 checks the bag and/or the DLR for any identification indicating to which ATM 304 the rejected check is associated, as illustrated by block 224. After identifying the proper ATM 304 the sorter 312 writes the ATM identification number 618 on the envelope and/or attaches an ATM 304 bar code label 616, as illustrated by block 226. If however, the rejected checks were initially put in an envelope 600 by the carrier 310, the sorter 312 determines if the envelope 600 has an ATM 304 identification bar code label 616, or number on it, as illustrated by diamond 228. If not, the sorter 312 determines the proper ATM identification number 618 from the bag and/or DLR, and writes in the ATM identification number 618 on the envelope 600, as illustrated by blocks 224 and 226.

If the original envelope 600 has the identification number, or after the sorter 312 puts the proper ATM identification number 618 on the envelope 600, the sorter 312 scans the ATM bar code label 616, or types in the ATM identification number 618 into the image capture application 125 in the image capture system 120, as illustrated by block 230. These scans log the envelopes 600 into the reject repair process. Thereafter, the sorter 312 removes the rejected checks from the envelope 600 and begins the image capture process, as illustrated by block 232. The rejected checks are scanned through the image capture system 120, as illustrated by block 234. The image capture application 125 creates an image file of the front and back of the rejected checks and sends the file to the image capture server 130 for storage by the image storage application 135. In some embodiments the image scanner has the ability to pull data from the rejected checks and populate, at least in part, a data file, as illustrated by block 236. Each rejected check has an associated data file linked to the check image. At this time in the process the data file is populated with the information on the envelope 600 from which the rejected check came, any data entered by the sorter 312 or other bank employee, along with any data that can be electronically pulled from the image file. This data includes at least, the ATM 310 identification number, and in some embodiments information from the DLR. In some embodiments of the invention, the rejected checks are scanned as images directly at the ATM 304 location by the carrier 310 through the use of an image capture device 120 that works remotely. This process would allow the research employees 104 to work on investigating the rejected checks for processing before they were ever delivered to the bank offices and sorted. This embodiment would remove days from the processing cycle.

Regardless of where the rejected checks are scanned into images, they may not contain all of the necessary data for processing. The data file associated with imaged checks is usually created automatically for deposits made at ATM 304 or branch bank locations. The data file is made during the deposit since the customer 302 is logged into the ATM 304 or speaking to a bank teller who has access to the customer's 302 accounts and, thus, the bank knows where to deposit the funds and who is trying to deposit the funds. However, for the rejected paper checks there is no associated data file. The bank only knows what is printed on the rejected checks, and that a failed deposit attempt occurred at the deposit location. The bank does not have an electronic record of where to deposit the rejected checks. The image files of the rejected checks may have the associated ATM identification number 618 in the data file, but the checks need to be researched further to determine the rest of the information needed in the data file for processing. Since the checks do not have the complete associated data file attached, they are processed as non-posting images, meaning they will not be sent to posting and settlement right away. The images of the checks will first be sent from the image capture systems 120 or image capture servers 130 along with any data, such as the ATM identification number 618 from the envelope 600, to the research employee computer system 110 through the network 102 for further investigation and processing by the research employee 104, as illustrated in block 238.

With the data from the envelope 600 and the image of the rejected check the research employee 104 can investigate what to do with the check through the use of the rejected check application 115. The research employee 104 can use the rejected check application 115 to connect to the bank computer systems 140 and access customer accounts, along with any incident tickets describing claims made by customers 302 to customer representatives 308. However, even if no claims have been made by a customer for a rejected check, the research employee 104 will still investigate the rejected check in order to identify any claims that should be made and to settle the rejected checks before the customers 302 are even aware of the situation.

As illustrated in FIG. 3, the research employee 104 first makes a determination on whether or not a rejected check has already posted, as illustrated by diamond 240. If the rejected check has already posted then the research employee 104 determines if the customer has received the credit for the rejected check, as illustrated by block 244. If the customer has received credit then the research employee 104 sends the check to the settlement process to receive the funds from the paying bank, as illustrated by block 246. This situation could occur, for example, if the rejected check was improperly placed into the reject bin when it was deposited in the ATM 310 or the carrier 304 mistakenly put the deposited check into the rejected checks envelope 600.

If the research employee 104 finds that the rejected check has not posted, the research employee 104 then determines if an account number is listed on the rejected check, as illustrated by diamond 242. If there is an account number on the check, the research employee 104 determines if the customer has received credit for the rejected check, as illustrated by diamond 244. If the customer has received credit, the process moves to posting and settlement, as illustrated by block 246. If, however, the item has not posted and the account number is not written on the check, or the customer has not received credit for the rejected check, the research employee 104 then investigates if there is any customer information on the electronic deposit list receipt ("EDLR"), such as, a customer name or account information, as illustrated by block 248. The EDLR can be obtained electronically through the bank computer systems 140, which stores a record of the deposits made at each ATM, or through a DLR image or data captured by a sorter 312, or other bank employee. The EDLR helps the research employee 104 determine to who's account the rejected check belongs. If there is no customer information for the rejected check on the EDLR, then the research employee 104 will use the bank computer systems 140 to see if a claim has been made for a deposit made at the ATM 304 for the rejected check amount, as illustrated by block 250. If no claim has been made, then the research employee 104 updates the system with the research information and holds the rejected check in process until a claim 1s made or more information is gathered because the rejected check currently does not have enough associated data for processing, as illustrated by block 252. If on the other hand, there is a claim already made for the particular ATM 304, the research employee 104 uses the research employee computer systems 110 to access account information for the customer 302, such as the customer's 302 name or the amount of the check, as illustrated by block 256.

If there is information on the EDLR, such as a debit card number, the research employee 104 determines if the information can be used to associate the rejected checks to a claim 1n the bank computer systems 140. As illustrated by diamond 254, if there is a claim, the research employee 104 checks the bank computer systems 140 for the customer's name, amount of the check, or other information to determine where to deposit the check, as illustrated by block 256.

As illustrated in diamond 254, if there is no claim, the research employee 104 then researches if there are any similar checks drawn on the same maker and payable to the same customer in the bank computer systems 140, as illustrated by diamond 258. If there are no similar checks, the research employee 104 investigates if there is any electronic journal ("EJ") information in the system for the same amount as the rejected check, as illustrated by diamond 260. If not, the research employee 104 processes the credit as a work in process ticket, the ticket includes the researched details, and the work in process ticket is sent on to the posting and settlement process, and held until a claim 1s made or more information is found, as illustrated by blocks 256, 246, 272, 274, and 276, as discussed later.

If however there are similar checks drawn and paid, or there is EJ information, the research employee 104 checks the bank computer systems 140 for the customer's 302 name or the amount of the check, as illustrated by block 264. Then the research employee 104 determines if there is a claim 1n the system for one of the customer accounts, as illustrated by diamond 266. If there is no claim, then the rejected check is processed as a work in process ticket, the ticket includes the researched details, and the work in process ticket is sent on to the posting and settlement process, and held until a claim 1s made or more information is found, as illustrated by blocks 256, 246, 272, 274, and 276, as discussed later.

If there is a claim for one of the customer accounts, or the customer's name or amount of check is found from block 256, then the research employee 104 investigates if the rejected check equals the claim amount, as illustrated by block 268. If they do not match, the research employee 104 notes in the bank computer systems 140 the details of the rejected check research thus far, so further research can be performed at a later date when a claim 1s made or additional information is discovered, as illustrated block 252. If the rejected check matches the claim amount, then the information identified during the research is included in the data file, such as the customer's account, as illustrated by block 270. Thereafter, the rejected check image and associated data file are sent to posting and settlement, as illustrated by block 246

As illustrated in FIG. 4, after the appropriate customer 302 information has been identified, the rejected check images and data files are received by posting and settlement, as illustrated by block 272. First, the proper account is identified, as illustrated by block 274. If the proper account is not known, the rejected check is credited internally to a charge off account until the proper account is identified, as illustrated by block 275. If the proper account is known, then the next step is to determine if the customer's 302 account needs to be credited or debited, as illustrated by diamond 276. If the customer's 302 account does not need to be adjusted, then the funds are retrieved from the paying bank, the general ledger and other accounting data is adjusted, as necessary, and the process ends, as illustrated by blocks 286, 288, and 290. However, if a change to the customer's 302 account is necessary, the bank computer systems 140 automatically, or manually through user operation, credits or debits the appropriate accounts, as illustrated by block 278.

The customer's account may be debited if the provisional funds were given to the customer after the customer made a claim, but it was later determined that the claim was invalid, as illustrated in block 280. These cases occur when a customer makes a claim when in fact a proper deposit had been made. Alternatively, the customer's 302 account may be credited with the amount of the rejected check if no provisional funds were originally extended to the customer, as illustrated by the block 282. This situation occurs if the customer never made a claim, but they had a rejected check that the bank identified and processed. Finally, the bank may have to credit or debit the customer's 302 account if the amount of provisional funds extended to the customer 302 is different than the amount of funds the customer 302 is owed under the rejected check, as illustrated by block 284.

Thereafter, the bank retrieves the funds from the paying bank if the rejected check was a legitimate check, or the rejected check was not already processed, as illustrated by block 286. The general ledger and other accounting measures are updated through the bank computer systems 140, as illustrated by block 288. The process is terminated after the accounts have been updated, as illustrated by termination block 290.

Some embodiments of the new system and process described herein will reduce the time required for the collection of the funds from the approximately twenty-five (25) days down to less than five (5) days. This may allow the bank to have access to the funds for an additional number of days to generate more income from other investments or lending. Furthermore, the float time on the rejected checks may be reduced enough so the customers 302 may never know that there is even an issue with their check being rejected. This will reduce the amount of resources needed to address customer 302 claims and process responses for the customer 302.

Specific embodiments of the invention are described herein. Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A rejected check processing method, comprising:
    collecting one or more rejected checks deposited in a remote capture system in a rejected checks bin in the remote capture system, separate from a plurality of accepted checks, that were deposited by a customer wherein the remote capture system is an ATM, a cash recycler, or branch deposit system, and wherein the one or more rejected checks are rejected in response to the remote capture system going offline during a transaction or failing to capture an image of one or more checks deposited during the transaction;
    acquiring the one or more rejected checks from the rejected check bin in the remote capture system;
    placing the one or more rejected checks into a rejected checks envelope with batch information for processing separate from the plurality of accepted checks, wherein the batch information identifies the remote capture system at which the one or more rejected checks were deposited;
    capturing an image of the one or more rejected checks using an image capture system, wherein the image capture system is unaffiliated with the remote capture system;
    creating a data file associated with the images of the one or more rejected checks that associates the one or more rejected checks with the remote capture system at which the one or more rejected checks were deposited based on the batch information on the rejected checks envelope, and wherein the data file further comprises information about the one or more rejected checks;
    accessing an electronic deposit list receipt of the remote capture system at which the one or more rejected checks were deposited;
    comparing the information about the one or more rejected checks and the electronic deposit list receipt to determine an account to associate the one or rejected checks with or a customer to associated the one or more rejected checks with; and
    posting or settling the one or more rejected checks to the account based on the account or the customer identified using the electronic deposit list receipt before the customer makes a claim that a customer's check did not post or settle.

2. The method of claim 1, wherein acquiring the one or more rejected checks comprises:
    removing the one or more rejected checks from the rejected check bin in the remote capture system.

3. The method of claim 1, wherein placing the one or more rejected checks into the rejected checks envelop with the batch information for processing comprises:
    placing the one or more rejected checks into an envelope at the location of the remote capture system.

4. The method of claim 3, wherein the batch information on the rejected checks envelope is machine-readable code.

5. The method of claim 3, wherein the batch information on the rejected checks envelope is machine-readable code, and wherein the batch information comprises a routing and tracking number for the one or more rejected checks, or uniquely identifies the rejected checks envelope.

6. The method of claim 1, wherein processing the one or more rejected checks based on information related to the batch information comprises:
    identifying computer-readable information related to the batch information for associating the one or more rejected checks with the remote capture system at which they were deposited.

7. The method of claim 1, wherein capturing an image of the one or more rejected checks comprises:
    scanning the one or more rejected checks through an image capture system in a high speed sorter located at a central check processing site.

8. The method of claim 1, wherein capturing an image of the one or more rejected checks comprises
    scanning the one or more rejected checks through an image capture system;

performing the scan at the location of the remote capture system; and sending the images of the one or more rejected checks to a representative for processing, wherein the images are sent electronically.

9. The method of claim 1, wherein creating the data file associated with the images of the one or more rejected checks comprises:

investigating the status of the one or more rejected checks; and populating the data file either manually or systematically with data processing information from at least one of the batch information, the one or more rejected checks, or customer accounts.

10. The method of claim 1, wherein the method further comprises:

researching the one or more rejected checks using the image files and data files for processing, wherein the researching comprises:

determining if claims have been made by customers for the plurality of rejected checks;

determining if the claims are valid; and determining if the one or more rejected checks are valid.

11. A method of processing rejected checks, comprising:

capturing one or more rejected checks at a deposit location in a rejected bin of a remote capture system, wherein the remote capture system is an ATM, a cash recycler, or branch deposit system, and wherein the one or more rejected checks are rejected in response to the remote capture system going offline during a transaction or failing to capture an image of one or more checks deposited during the transaction;

placing the one or more rejected checks into a rejected checks envelope comprising batch information used for processing the one or more rejected checks, wherein the batch information identifies the remote capture system at which the one or more rejected checks were deposited;

capturing images of the one or more rejected checks using an image capture system, wherein the image capture system is unaffiliated with the remote capture system;

creating a data file associated with the images of the one or more rejected checks that associates the one or more rejected checks with the remote capture system at which the one or more rejected checks were deposited based on the batch information on the rejected checks envelope, and wherein the data file further comprises information about the one or more rejected checks;

accessing an electronic deposit list receipt of the remote capture system at which the one or more rejected checks were deposited;

comparing the information about the one or more rejected checks and the electronic deposit list receipt to determine an account to associate the one or rejected checks with or a customer to associated the one or more rejected checks with; and posting or settling the one or more rejected checks to the account based on the account or the customer identified using the electronic deposit list receipt before the customer makes a claim that a customer's check did not post or settle.

12. The method of claim 11, wherein the batch information is a batch header comprising routing and transit information identifying the deposit location of the remote capture system.

13. The method of claim 12, wherein processing the one or more rejected checks based on the batch information located on the rejected checks envelope comprises:

entering manually or systematically the batch information for the deposit location from the rejected checks envelope into an application.

14. The method of claim 11, wherein capturing an image of the one or more rejected checks comprises:

scanning the one or more checks through an image capture system in a high speed sorter located at a central check processing site into an application.

15. The method of claim 11, wherein capturing an image of the one or more rejected checks comprises:

scanning the one or more checks through an image capture system;

performing the scan at the deposit location of the remote capture system; and sending the images of the one or more rejected checks to a representative for processing, wherein the images are sent electronically.

16. The method of claim 11, wherein creating the data file associated with the image of the one or more rejected checks comprises:

investigating the status of the one or more plurality of rejected checks; and populating the data file either manually or systematically with batch information from at least one of the rejected checks envelope , the one or more rejected checks, or customer accounts.

17. The method of claim 11, wherein the method further comprises:

researching the one or more rejected checks for processing using the image files and data files, wherein the researching comprises:

determining if claims have been made by customers for the one or more rejected checks;

determining if the claims are valid; and determining if the one or more rejected checks are valid.

18. A method for processing rejected checks, comprising:

securing paper copies of one or more rejected checks in a rejected bin in a remote capture system that were deposited by a customer, wherein the remote capture system is an ATM, a cash recycler, or branch deposit system, and wherein the one or more rejected checks are rejected in response to the remote capture system going offline during a transaction or failing to capture an image of one or more checks deposited during the transaction;

sorting the one or more rejected checks into batches apart from accepted checks;

placing the paper copies of the one or more rejected checks into a rejected checks envelope, wherein the rejected checks envelope has machine-readable code attached thereto, wherein the machine-readable code at least identifies the remote capture system at which the one or more rejected checks were deposited; and processing the rejected checks envelope by capturing image files of the one or more rejected checks in the rejected checks envelope using an image capture system, wherein the image capture system is unaffiliated with the remote capture system, identifying the machine-readable code attached to the rejected checks envelope and on the one or more rejected checks, using a machine to read the machine-readable code, creating a data file associated with the images of the one or more rejected checks that associates the one or more rejected checks with the remote capture system at which the one or more rejected checks were deposited and wherein the data file further comprises information about the one or more rejected checks identified from the machine-readable code attached to the rejected checks envelope or the one or more rejected checks, accessing an electronic deposit list receipt of the remote capture system at which the one or more rejected checks were deposited;

comparing the information about the one or more rejected checks and the electronic deposit list receipt to determine an account to associate the one or rejected checks with or a customer to associated the one or more rejected checks with; and posting or settling the one or more rejected checks to the account based on the account or the customer identified using the electronic deposit list receipt before the customer makes a claim that a customer's check did not post or settle.

19. The method of claim 18, wherein the data obtained by the machine from the machine-readable code comprises information uniquely identifying the rejected checks envelope.

20. The method of claim 18, wherein the data obtained by the machine from the machine-readable code comprises routing and transmitting information identifying where the one or more rejected checks should be routed and transmitted.

21. The method of claim 18, wherein associating the image files of the one or more rejected checks with data obtained by the machine from the machine-readable code comprises:

creating data files associated with the image files of the one or more rejected checks, wherein the data files include the data obtained from the machine-readable code.

22. A rejected check processing system, comprising:

an envelope configured to hold one or more rejected checks captured in a rejected check bin at a remote capture system, wherein the remote capture system is an ATM, a cash recycler, or branch deposit system, and wherein the one or more rejected checks are rejected in response to the remote capture system going offline during a transaction or failing to capture an image of one or more checks deposited during the transaction; and a first machine-readable code attached to or configured to be attached to the rejected checks envelope and configured to identify the remote capture device at which the one or more rejected were submitted;

wherein an image capture device that is unaffiliated with the remote capture system is used to capture images of the one or more rejected checks;

wherein the first machine-readable code is used to capture information about the remote capture system at which the one or more rejected checks were deposited;

wherein a data file is created and associates the images of the one or more rejected checks with the remote capture system at which the one or more rejected checks were deposited based on the batch information on the rejected check envelope, and wherein the data file further comprises information about the one or more rejected checks;

wherein an electronic deposit list receipt is accessed from the remote capture system at which the one or more rejected checks were deposited;

wherein the information about the one or more rejected checks is compared to the electronic deposit list receipt to determine an account to associate the one or rejected checks with or a customer to associated the one or more rejected checks with; and wherein the one or more rejected checks are posted or settled to the account based on the account or the customer identified using the electronic deposit list receipt before the customer makes a claim that a customer's check did not post or settle.

23. The rejected check processing system of claim 22, wherein the rejected checks envelope is configured to hold one or more rejected checks that were rejected at a single remote image capture device.

24. The rejected check processing system of claim 22, wherein the remote capture device comprises an automated teller machine (ATM).

25. The rejected check processing system of claim 22, wherein the first machine-readable code comprises a barcode that uniquely identifies the remote capture device.

26. The rejected check processing system of claim 22, wherein the first machine-readable code comprises a radio frequency identification tag that uniquely identifies the remote capture device.

27. The rejected check processing system of claim 22, wherein the first machine-readable code is attached to a label configured to be attached to the rejected checks envelope.

28. The rejected check processing system of claim 22, further comprising:

a second machine-readable code attached to or configured to be attached to the rejected checks envelope and configured to uniquely identify the rejected checks envelope or provide a routing and transit number.

29. The rejected check processing system of claim 28, wherein the second machine-readable code comprises a magnetic ink character recognition identification marking that can be used to uniquely identify the rejected checks envelope.

30. The rejected check processing system of claim 28, wherein the rejected checks envelope, having the first and second machine-readable codes attached thereto, is configured to be used as a batch header on a bulk capture device.

31. The rejected check processing system of claim 22, further comprising a machine configured to read the first machine-readable code and associate all of the rejected checks contained within the rejected checks envelope with data obtained from the machine-readable code.

32. The rejected check processing system of claim 22, comprising:

a window in the rejected checks envelope for determining rejected checks are located within the rejected checks envelope.

33. The rejected check processing system of claim 22, further comprising:

a memory device;

a machine-readable code reader configured to read the first machine-readable code associated with the rejected checks envelope and obtain information therefrom;

an imaging device configured to capture an image of one or more rejected checks contained in the rejected checks envelope; and a processing device, configured to store, in the memory device, the captured images of the one or more rejected checks contained in the rejected checks envelope and associate the captured images in the memory device with the information obtained from the first machine-readable code.

34. An apparatus for processing one or more rejected checks, the apparatus comprising:

a memory device;

a machine-readable code reader configured to receive a plurality of rejected check envelopes, each rejected check envelope containing one or more rejected checks and having a first machine-readable code thereon, wherein the machine-readable code reader is configured to read the first machine-readable code on each of the plurality of rejected check envelops and obtain batch information therefrom, wherein the batch information identifies the remote capture system at which the one or more rejected checks were deposited;

an imaging device configured to capture an image of the one or more rejected checks contained in each of the plurality of rejected check envelopes; and a processing device, configured to store, in the memory device, the captured images of the one or more rejected checks and associate each captured image in the memory device with the batch information identifying the remote capture system at which the one or more rejected checks were deposited that is obtained from the first machine-readable code on the plurality of rejected check envelopes in which the captured rejected check associated with the captured image arrived;

wherein the remote capture system is an ATM, a cash recycler, or branch deposit system, and wherein the one or more rejected checks are rejected in response to the remote capture system going offline during a transaction or failing to capture an image of one or more checks deposited during the transaction;

wherein the one or more rejected checks are acquired from the rejected check bin in the remote capture system and placed in the rejected check envelope;

wherein the image device is unaffiliated with the remote capture system;

wherein a data file is created and associates the images of the one or more rejected checks with the remote capture system at which the one or more rejected checks were deposited based on the batch information on the rejected check envelope, and wherein the data file further comprises information about the one or more rejected checks;

wherein an electronic deposit list receipt is accessed from the remote capture system at which the one or more rejected checks were deposited;

wherein the information about the one or more rejected checks is compared to the electronic deposit list receipt to determine an account to associated the one or rejected checks with or a customer to associated the one or more rejected checks with; and wherein the one or more rejected checks are posted or settled to the account based on the account or the customer identified using the electronic deposit list receipt before the customer makes a claim that a customer's check did not post or settle.

35. The apparatus of claim 34, wherein the remote capture system comprises an automated teller machine (ATM).

36. The apparatus of claim 34, wherein the batch information obtained from the machine-readable code comprises a routing and transit number or a unique envelope number.

* * * * *